United States Patent
Mikayama (10) Patent No.: US 10,419,711 B2
(45) Date of Patent: Sep. 17, 2019

(54) DISPLAY APPARATUS AND DISPLAY METHOD

(71) Applicant: PANASONIC INTELLECTUAL PROPERTY MANAGEMENT CO., LTD., Osaka (JP)

(72) Inventor: Satoshi Mikayama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/980,285

(22) Filed: May 15, 2018

(65) Prior Publication Data

US 2018/0338105 A1   Nov. 22, 2018

(30) Foreign Application Priority Data

May 19, 2017  (JP) .................................. 2017-100302

(51) Int. Cl.
*H04N 5/58* (2006.01)
*G09G 5/10* (2006.01)

(52) U.S. Cl.
CPC ................ *H04N 5/58* (2013.01); *G09G 5/10* (2013.01); *G09G 2360/144* (2013.01); *G09G 2380/10* (2013.01)

(58) Field of Classification Search
CPC ....... H04N 5/58; G09G 5/10; G09G 2360/144
USPC ...................................................... 348/602
See application file for complete search history.

(56) References Cited

U.S. PATENT DOCUMENTS

| 6,762,741 | B2 * | 7/2004 | Weindorf ................. G09G 3/20 345/102 |
| 7,744,216 | B1 * | 6/2010 | Uhlhorn ................... G09G 5/00 351/204 |
| 2002/0075136 | A1 * | 6/2002 | Nakaji ................... B60K 35/00 340/425.5 |
| 2014/0043350 | A1 * | 2/2014 | Ikeda ........................ G01J 1/02 345/589 |
| 2015/0168720 | A1 * | 6/2015 | Oh ............................ B60R 1/00 345/690 |
| 2016/0062113 | A1 * | 3/2016 | El-Ghoroury ...... G02B 27/0101 345/647 |
| 2017/0168295 | A1 * | 6/2017 | Iwami .................. G02B 27/017 |

(Continued)

FOREIGN PATENT DOCUMENTS

| EP | 0 992 969 | 4/2000 |
| JP | 11-311972 | 11/1999 |
| JP | 2004-351943 | 12/2004 |

*Primary Examiner* — Michael Lee
(74) *Attorney, Agent, or Firm* — Greenblum & Bernstein, P.L.C.

(57) ABSTRACT

A display apparatus includes: an obtaining unit that obtains, from an illuminance sensor, a detected illuminance which is an illuminance at a dashboard of a vehicle detected by the illuminance sensor; an estimating unit that estimates, using the detected illuminance, an estimated illuminance which is an illuminance at a position near the head of a driver sitting in a driver's seat of the vehicle; a determining unit that determines brightness of a video, using the estimated illuminance and relationship information indicating a predetermined relationship between illuminance and brightness; and a displaying unit that displays the video at the brightness determined by the determining unit.

5 Claims, 8 Drawing Sheets

(56) References Cited

U.S. PATENT DOCUMENTS

2018/0172993 A1* 6/2018 Nill .................... G02B 27/0101
2018/0218711 A1* 8/2018 Suzuki .................. B60K 35/00

* cited by examiner

DISPLAY APPARATUS AND DISPLAY METHOD

CROSS REFERENCE TO RELATED APPLICATIONS

The present application is based on and claims priority of Japanese Patent Application No. 2017-100302 filed on May 19, 2017. The entire disclosure of the above-identified application, including the specification, drawings and claims is incorporated herein by reference in its entirety.

FIELD

The present disclosure relates to a display apparatus that changes brightness of a video to be displayed according to the illuminance around a vehicle.

BACKGROUND

Patent Literature 1 and 2 disclose a display apparatus that changes the brightness of a light-emitting display according to an illuminance change obtained from an optical sensor.

CITATION LIST

Patent Literature

[Patent Literature 1] Japanese Unexamined Patent Application Publication No. 11-311972
[Patent Literature 2] Japanese Unexamined Patent Application Publication No. 2004-351943

SUMMARY

Technical Problem

In Patent Literature 1, however, depending on the placement of the optical sensor (illuminance sensor), the brightness of the video could not be adjusted effectively.

In view of this, the present disclosure provides a display apparatus capable to effectively adjusting the brightness of a video even when there is a constraint on the placement of the illuminance sensor.

Solution to Problem

A display apparatus according to an aspect of the present disclosure includes: an obtaining unit configured to obtain, from an illuminance sensor, a detected illuminance which is an illuminance at a dashboard of a vehicle detected by the illuminance sensor; an estimating unit configured to estimate, using the detected illuminance, an estimated illuminance which is an illuminance at a position near the head of a driver sitting in a driver's seat of the vehicle; a determining unit configured to determine brightness of a video, using the estimated illuminance and relationship information indicating a predetermined relationship between illuminance and brightness; and a displaying unit configured to display the video at the brightness determined by the determining unit.

It should be noted that these general or specific aspects may be realized by a system, a method, an integrated circuit, a computer program, or a computer-readable recording medium such as a CD-ROM, and may be realized by an arbitrary combination of a system, a method, an integrated circuit, a computer program, and a recording medium.

Advantageous Effects

According to the display apparatus according to the above-described aspect, the brightness of a video can be effectively adjusted even when there is a constraint on the placement of the illuminance sensor.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS (Underlying Knowledge Forming the Basis of the Present Disclosure)

The inventor has found that the subsequent problems occur with the display apparatus described in the "Background Art" section.

In the display apparatus disclosed in Patent Literature 1, flickering in the light-emitting display is reduced by controlling brightness so that, even when outside illuminance changes, the brightness of the light-emitting display does not change until a predetermined time passes from when the brightness is changed.

However, in the display apparatus of Patent Literature 1, there is the problem that brightness adjustment cannot be performed immediately to follow the change in outside illuminance.

Furthermore, in the display apparatus of Patent Literature 2, the speed for following the change in outside illuminance is changed to thereby perform brightness adjustment immediately to follow a change in illuminance.

However, in the display apparatus of Patent Literature 2, there is the problem that, in an environment in which outside illuminance changes greatly in cycles of several seconds, occurrence of flickering in the brightness of the video cannot be sufficiently reduced.

In other words, in the conventional techniques, it was not possible to adjust the brightness of video immediately in accordance with a change in outside illuminance and sufficiently reduce occurrence of flickering in the brightness of the video.

In order to solve such problems, a display apparatus according to an aspect of the present disclosure includes: an obtaining unit that obtains, from an illuminance sensor, a detected illuminance which is an illuminance at a dashboard of a vehicle detected by the illuminance sensor; an estimating unit that estimates, using the detected illuminance, an estimated illuminance which is an illuminance at a position near the head of a driver sitting in a driver's seat of the vehicle; a determining unit that determines brightness of a video, using the estimated illuminance and relationship information indicating a predetermined relationship between illuminance and brightness; and a displaying unit that displays the video at the brightness determined by the determining unit.

Accordingly, the illuminance change at the position of the head of the driver is estimated, and the brightness of video to be displayed by the displaying unit is determined according to the estimated illuminance obtained by estimating. For example, the estimated illuminance can be obtained by converting the illuminance obtained by an optical sensor to the illuminance at the position of the head of the driver, based on the difference in illuminance at the mounting position of the optical sensor and at the position of the head of the driver. As such, the brightness of the video can be adjusted to a brightness that is in accordance with the illuminance change felt by the driver. Accordingly, the brightness of the video can be effectively adjusted.

Furthermore, the display apparatus may further include the illuminance sensor that detects illuminance at the dashboard, at a plurality of timings that are different. The obtaining unit may obtain a plurality of detected illuminances detected by the illuminance sensor at the plurality of timings, and the estimating unit may calculate an illuminance between a first detected illuminance detected at a first timing and a first estimated illuminance estimated at a timing ahead of the first timing, as a second estimated illuminance at the first timing.

As such, it is possible to make the illuminance change in the plurality of detected illuminances gradual, and estimate an estimated illuminance. Accordingly, the brightness of the video can be effectively adjusted to a brightness that is in accordance with the illuminance change felt by the driver.

Furthermore, the estimating unit may calculate the second estimated illuminance using Equation 1 below.

[Math. 1]

$$\overline{X(n+1)} = \frac{N * \overline{X(n)} + X(n+1)}{(N+1)} \quad \text{(Equation 1)}$$

where:

$\overline{X(n+1)}$ is the second estimated illuminance;
$\overline{X(n)}$ is an average value of detected illuminances at first to nth timings;
$X(n+1)$ is a detected illuminance at an (n+1)th timing;
n is a natural number greater than or equal to 2; and
N is a natural number greater than or equal to 2.

As such, it is possible to effectively estimate the illuminance change at the position of the head of the driver.

Furthermore, the estimating unit may: calculate the second estimated illuminance using Equation 1, with N as a value less than or equal to a first threshold value, when a ratio between the first detected illuminance and the average value is greater than or equal to k or less than or equal to 1/k; and calculate the second estimated illuminance using Equation 1, with N as a value greater than or equal to a second threshold value greater than the first threshold value, when the ratio is less than k and greater than 1/k.

As such, when the illuminance change is big, the estimated illuminance can be estimated so that the illuminance difference in the estimated illuminance becomes bigger, and when the illuminance change is small, the estimated illuminance can be estimated so that the illuminance difference in the estimated illuminance becomes smaller. Accordingly, the brightness of the video can be effectively adjusted to a brightness that is in accordance with the illuminance change felt by the driver.

Furthermore, the estimating unit may: calculate the second estimated illuminance by adding, to the first estimated illuminance, a value less than an absolute value of a difference between the first detected illuminance and the first estimated illuminance, when the first detected illuminance is greater than the first estimated illuminance; and calculate the second illuminance by subtracting, from the first estimated illuminance, a value less than the absolute value, when the first detected illuminance is less than the first estimated illuminance.

Furthermore, the estimating unit may perform a predetermined mathematical operation on an initial detected illuminance that is detected at an initial timing, to calculate an initial estimated illuminance at the initial timing.

As such, the estimated illuminance can be easily estimated.

It should be noted that these general or specific aspects may be realized by a system, a method, an integrated circuit, a computer program or a computer-readable recording medium such as a CD-ROM, and may be realized by an arbitrary combination of a system, a method, an integrated circuit, a computer program, and a recording medium.

Hereinafter, an information presentation apparatus according to an aspect of the present invention will be specifically described with reference to the Drawings.

It should be noted that each of the subsequently-described exemplary embodiments shows a specific example. The numerical values, shapes, materials, structural components, the arrangement and connection of the structural components, steps, the processing order of the steps, etc. shown in the following exemplary embodiments are mere examples, and are not intended to limit the scope of the present disclosure. Furthermore, among the structural components in the following exemplary embodiments, components not recited in any one of the independent claims which indicate the broadest concepts are described as arbitrary structural components.

Embodiment 1

1. Configuration

Figure 1:
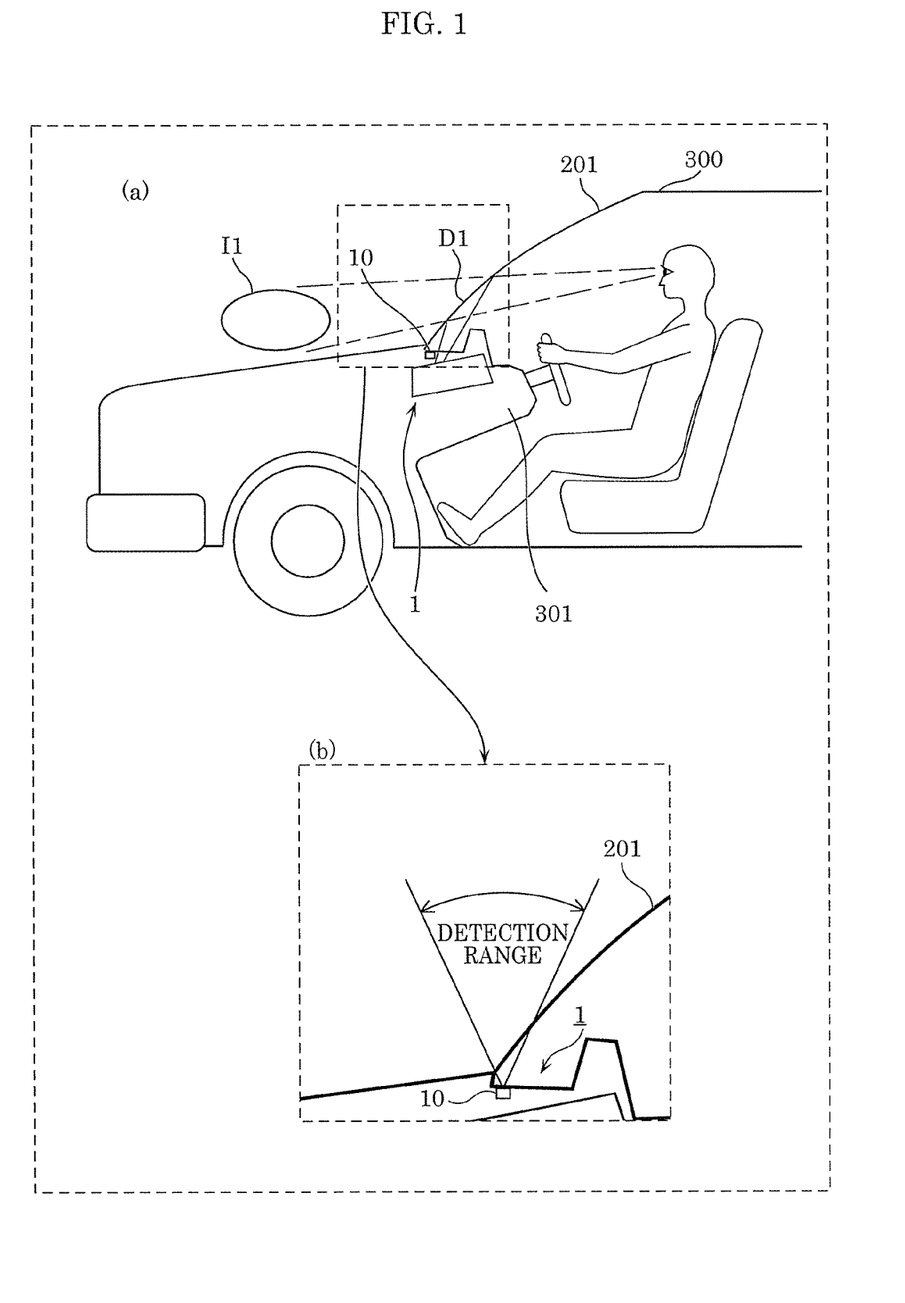
FIG. 1 is a diagram illustrating a usage example of a display apparatus according to an embodiment.

FIG. 1 is a diagram illustrating a usage example of a display apparatus according to this embodiment. In FIG. 1, (b) is an enlarged view for describing the detection range of detecting unit 10 in (a) in FIG. 1.

Display apparatus 1 according to this embodiment is configured as an on-board head-up display (HUD), and is attached near the top face of dashboard 301 of vehicle 300.

Display apparatus 1 projects light onto region D1 of windshield (front glass) 201 which is the display medium. The projected light is reflected by windshield 201. This reflected light heads toward the eyes of a driver sitting in the driver's seat, who is the user of display apparatus 1. The driver sees the reflected light entering his/her eyes as virtual image I1 visible on the opposite side (side outside the vehicle) of windshield 201, with an actual object visible past windshield 201 as a background. In this embodiment, this series of situations is expressed as display apparatus 1 displaying virtual image I1 using windshield 201.

Figure 2:
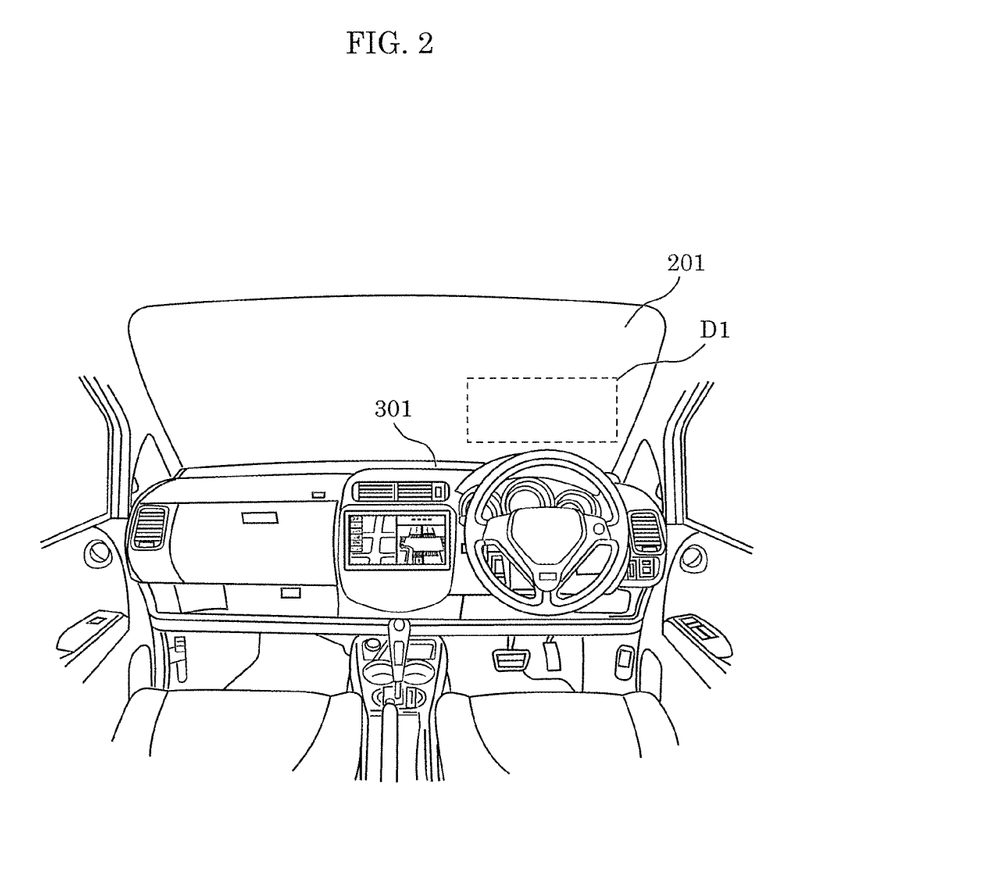
FIG. 2 is a diagram illustrating an example of D1 which is a region onto which light is projected by display apparatus 1 according to the embodiment.

FIG. 2 is a diagram illustrating an example of D1 which is a region onto which light is projected by display apparatus 1 according to this embodiment.

As illustrated in FIG. 2, display apparatus 1 attached to dashboard 301 projects light onto region D1 (region surrounded by a broken line in the figure) located, for example, toward the bottom on the driver's side of windshield 201. With this, virtual image I1 (see FIG. 1), which is visible on the opposite side (side outside the vehicle) of windshield 201 when seen from the driver sitting in the driver's seat, is displayed. It should be noted that, from the driver's perspective, virtual image I1 appears to be nearer in the depth direction of a three-dimensional image space when light is projected onto a lower position in region D1, and appears to be farther when light is projected onto a higher position in region D1.

Figure 3:
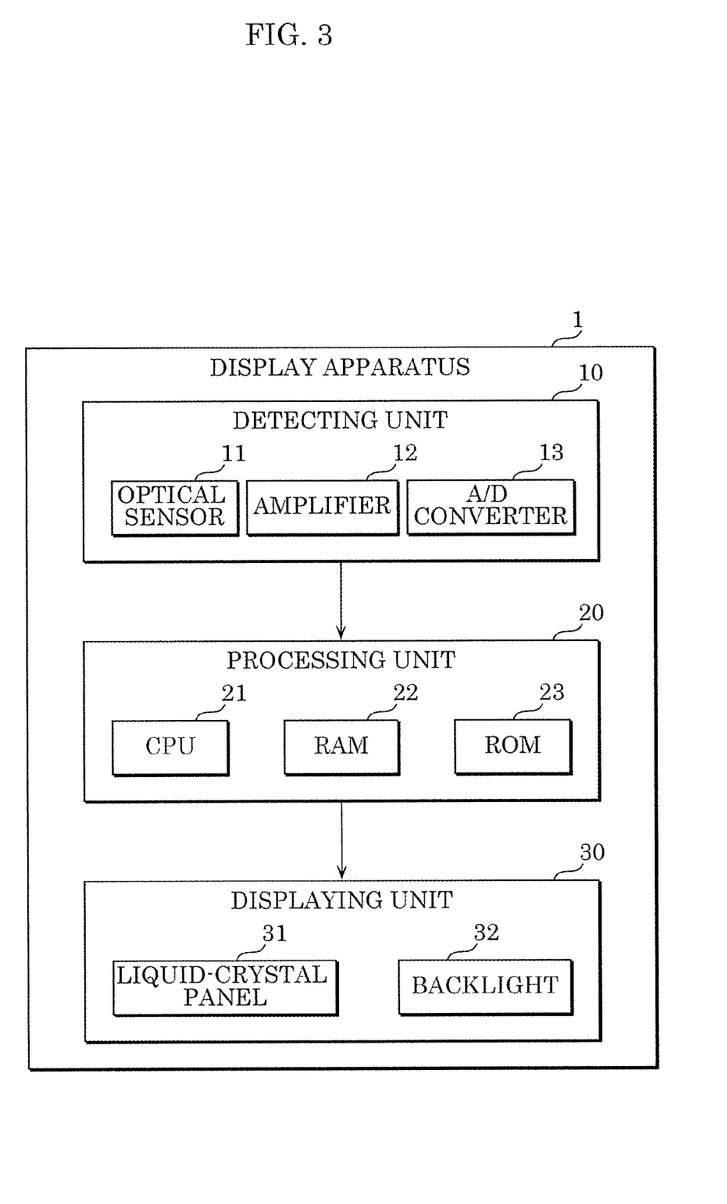
FIG. 3 is a block diagram illustrating the hardware configuration of the display apparatus according to the embodiment.

FIG. 3 is a block diagram illustrating the hardware configuration of the display apparatus according to this embodiment.

Display apparatus 1 includes detecting unit 10, processing unit 20, and displaying unit 30.

Detecting unit 10 is an illuminance sensor that is disposed in dashboard 301 of vehicle 300, detects the illuminance at dashboard 301, and outputs a detected illuminance which is the result of the detection. As illustrated in (b) in FIG. 1, detecting unit 10 mainly detects light entering the cabin from above vehicle 300, at dashboard 301. Detecting unit 10 is disposed so that the optical axis of detecting unit 10 is oriented toward a space above the main viewing angle of the driver. Detecting unit 10 is disposed in order to detect the illuminance in the vicinity of virtual image I1 but actually detects the illuminance above the position of virtual image I1 because dashboard 301 is located lower than the driver's eye point.

Furthermore, detecting unit 10 detects the illuminance at dashboard 301 at a plurality of different timings, and outputs the detected illuminances detected at the plurality of timings. Detecting unit 10 detects the illuminance at every first time period (for example, 100 msec.), and outputs the detected illuminance. It should be noted that detecting unit 10 may store a plurality of detected illuminances for a second time period longer than the first time period, and output the plurality of detected illuminances every second time period.

Specifically, detecting unit 10 includes optical sensor 11, amplifier 12, and A/D (analog-to-digital) converter 13.

Optical sensor 11 receives light, and outputs an electrical signal of a level that corresponds to the brightness of the received light. Amplifier 12 amplifies the electrical signal outputted by optical sensor 11, and outputs the amplified signal. A/D converter 13 converts the electrical signal outputted by amplifier 12, which consists of an analog signal, into a digital signal, and outputs the electrical signal obtained through the conversion, which consists of a digital signal. Specifically, detection unit 10 according to this embodiment outputs, as a detected illuminance, an electrical signal that consists of a digital signal.

Processing unit 20 determines the brightness of the video to be displayed by displaying unit 30, by performing signal processing on the electrical signal outputted by detecting unit 10. The specific details of the signal processing will be described later.

Processing unit 20 includes CPU (central processing unit) 21, RAM (random access memory) 22, and ROM (read only memory) 23. CPU 21 performs predetermined signal processing on the obtained electrical signal by executing a specified program. RAM 22 is a volatile storage area (main storage device) used as the work area that is used when CPU 21 executes the specified program. ROM 23 is a nonvolatile storage area (auxiliary storage device) that holds the predetermined program, various data, etc.

It should be noted that as long as processing unit 20 is capable of executing the signal processing, processing unit 20 is not limited to the above-described configuration. For example, processing unit 20 may be configured by a dedicated circuit that executes the signal processing. In other words, the functions of processing unit 20 may be realized by performing software processing, or may be realized by performing hardware processing.

Displaying unit 30 displays video on windshield 201 by projecting light onto windshield 201. Displaying unit 30 includes liquid-crystal panel 31 and backlight 32. Liquid-crystal panel 31 includes liquid crystal elements arranged in an array, and adjusts the brightness of respective pixels based on an input video signal, by way of the liquid-crystal elements being driven by a drive circuit not illustrated in the figures. Backlight 32 is a light source that emits light to liquid-crystal panel 31, and includes, for example, a plurality of LEDs (light-emitting diodes). Displaying unit 30 adjusts the brightness of video to be projected, based on brightness information indicating the brightness of the video, outputted by processing unit 20. In other words, displaying unit 30 displays video at the brightness indicated by the brightness information.

Figure 4:
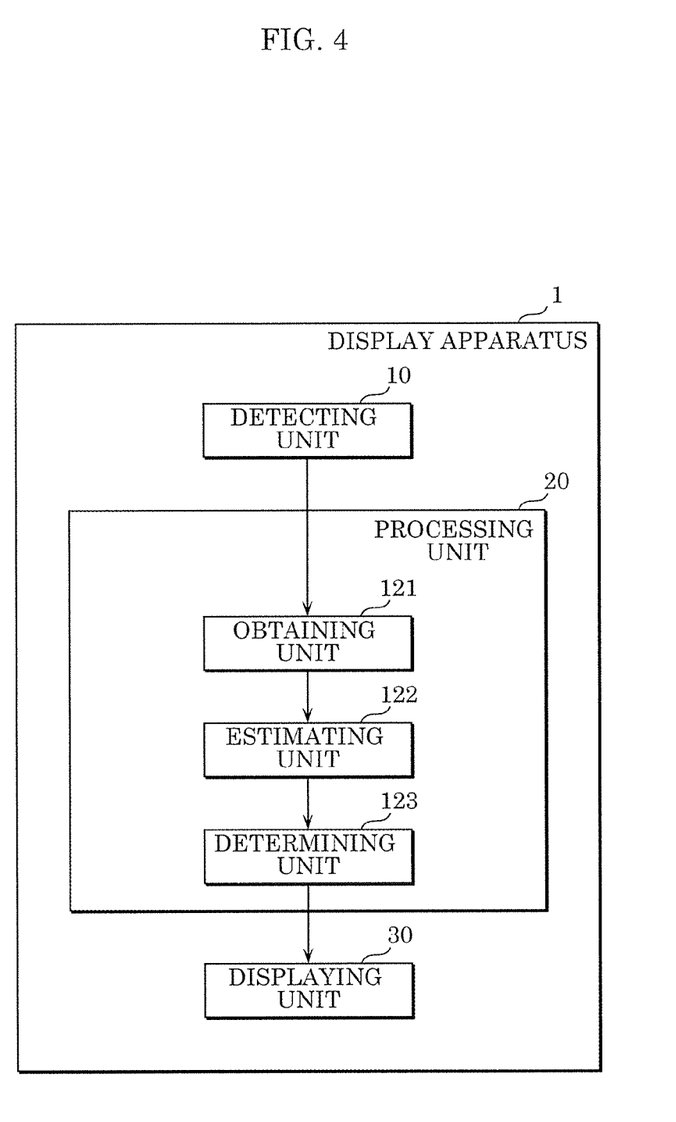
FIG. 4 is a block diagram illustrating the functional configuration of the display apparatus according to the embodiment.

FIG. 4 is a block diagram illustrating the functional configuration of the display apparatus according to this embodiment.

As illustrated in FIG. 4, processing unit 20 functionally includes obtaining unit 121, estimating unit 122, and determining unit 123. Obtaining unit 121 obtains, from detecting unit 10, the detected illuminance at the dashboard of vehicle 300 which was detected by detecting unit 10. Obtaining unit 121 obtains the plurality of detected illuminances detected by detecting unit 10 at the plurality of timings.

Estimating unit 122 estimates an estimated illuminance which is the illuminance at a position near the head of the driver sitting in the driver's seat of vehicle 300, using the detected illuminance obtained by obtaining unit 121. Here, a position near the head of the driver sitting in the driver's seat is, for example, the position of the headrest of the driver's seat of vehicle 300.

Specifically, estimating unit 122 calculates an illuminance between a first detected illuminance detected at a first timing and a first estimated illuminance estimated at a timing that is ahead of the first timing, as a second estimated illuminance at the first timing. More specifically, when the first estimated illuminance is greater than the first estimated illuminance, estimating unit 122 calculates, as the second estimated illuminance, an illuminance that is greater than the first estimated illuminance and less than the first detected illuminance. When the first estimated illuminance is less than the first estimated illuminance, estimating unit 122 calculates, as the second estimated illuminance, an illuminance that is greater than the first detected illuminance and less than the first estimated illuminance.

Specifically, estimating unit 122 calculates the second estimated illuminance using Equation 1 below.

[Math. 2]

$$\overline{X(n+1)} = \frac{N * \overline{X(n)} + X(n+1)}{(N+1)} \quad \text{(Equation 1)}$$

where:
$\overline{X(n+1)}$ is the second estimated illuminance;
$\overline{X(n)}$ is an average value of detected illuminances at first to nth timings;
X(n+1) is a detected illuminance at an (n+1)th timing;
n is a natural number greater than or equal to 2; and
N is a natural number greater than or equal to 2.

It should be noted that, when Equation 2 or Equation 3 below are satisfied, estimating unit 122 calculates the second estimated illuminance using Equation 1, with N as value a which is less than or equal to a first threshold value.

[Math. 3]

$$X(n) >> \overline{X(n-1)} \quad \text{(Equation 2)}$$

or $$X(n) << \overline{X(n-1)} \quad \text{(Equation 3)}$$

When the ratio between the first detected illuminance at the nth timing and the average value (see [Math. 4] below) of detected illuminances up to the immediately preceding (n−1)th timing is greater than or equal to k or less than or equal to 1/k, estimating unit 122 calculates the second estimated illuminance using Equation 1, with N as value a which is less than or equal to the first threshold value. The first threshold value is, for example, 5 and k is, for example, 10.

Average value $\overline{X(n-1)}$ [Math. 4]

In addition, when Equation 4 satisfied, estimating unit 122 may calculate the second estimated illuminance using Equation 1, with value a, which is less than or equal to the first threshold value, as "2" for example.

[Math. 5]

$$\log_{10}\left(\frac{X(n+1)}{\overline{X(n)}}\right) \geq 1 \cap \log_{10}\left(\frac{X(n)}{\overline{X(n+1)}}\right) \geq \quad \text{(Equation 4)}$$

$$1 \cap \log_{10}\left(\frac{X(n-1)}{\overline{X(n-2)}}\right) \geq 1,$$

$$\log_{10}\left(\frac{X(n+1)}{\overline{X(n)}}\right) \leq -1 \cap \log_{10}\left(\frac{X(n)}{\overline{X(n+1)}}\right) \leq$$

$$-1 \cap \log_{10}\left(\frac{X(n-1)}{\overline{X(n-2)}}\right) \leq -1$$

Specifically, when three ratios calculated according to three consecutive timings are each greater than or equal to k or less than or equal to 1/k, estimating unit 122 may calculate the second estimated illuminance using Equation 1, with N in Equation 1 as value a which is less than or equal to the first threshold value. Each of the three ratios is the ratio between the detected illuminance detected at the corresponding timing and the average value of the detected illuminances up to the immediately preceding timing.

On the other hand, when Equation 3 and Equation 4 are not satisfied, estimating unit 122 calculates the second estimated illuminance using Equation 1, with N as value b which is greater than or equal to a second threshold value greater than the first threshold value. When the ratio between the first detected illuminance at a first timing and the average value (see [Math. 6] below) of detected illuminances up to the immediately preceding (n−1)th timing is less than k and greater than 1/k, estimating unit 122 calculates the second estimated illuminance using Equation 1, with N as a value b greater than or equal to a second threshold value. The second threshold value is, for example, 19.

Average value $\overline{X(n-1)}$ [Math. 6]

In addition, when Equation 2 is not satisfied, estimating unit 122 may calculate the second estimated illuminance using Equation 1, with value b, which is greater than or equal to the second threshold value, as "19" for example. Specifically, when three ratios calculated according to three consecutive timings are each less than k and greater than 1/k, estimating unit 122 may calculate the second estimated illuminance using Equation 1, with N in Equation 1 as value b which is greater than or equal to the second threshold value. Each of the three ratios is the ratio between the detected illuminance detected at the corresponding timing and the average value of the detected illuminances up to the immediately preceding timing.

In this manner, when the change in detected illuminance is sharp, estimating unit 122 calculates the second estimated illuminance using a weighted average by which the average value up to that point is approximately 66% and the illuminance detected at that time is approximately 33%. Specifically, since estimating unit 122 calculates the second estimated illuminance using a weighted average by which the detected illuminance is a relatively large percentage with respect to the average value up to that point, the change in estimated illuminance can be made relatively large within a variation range that is smaller than the change in detected illuminance.

In this manner, when the change in detected illuminance is gradual, estimating unit 122 calculates the second estimated illuminance using a weighted average by which the average value up to that point is approximately 95% and the illuminance detected at that time is approximately 5%. Specifically, since estimating unit 122 calculates the second estimated illuminance using a weighted average in which the detected illuminance is a small percentage with respect to the average value up to that point, the change in estimated illuminance can be further reduced.

It should be noted that estimating unit 122 performs a predetermined mathematical operation on an initial detected illuminance that is detected at an initial timing to thereby calculate the initial estimated illuminance at the initial timing. For example, estimating unit 122 may directly set the initial detected illuminance as the initial estimated illuminance, or perform calculation such that the initial estimated illuminance is an illuminance obtained by multiplying the initial detected illuminance by a certain coefficient, or perform calculation such that the initial estimated illuminance is an illuminance obtained by adding or subtracting a certain value to/from the initial detected illuminance.

It should be noted that that the plurality of detected illuminances obtained by obtaining unit 121 and the plurality of estimated illuminances calculated by estimating unit 122 are stored in ROM 23.

Determining unit 123 determines the brightness of the video by using the estimated illuminance and relationship information indicating a predetermined relationship between illuminance and brightness. The relationship information is, for example, a table indicating the relationship between a plurality of illuminances with mutually different magnitudes, and brightness that is predetermined corresponding to each of the plurality of illuminances. The relationship information is not limited to a table as long as it is information indicating the correspondence relationship between the plurality of illuminances and the plurality of brightnesses, and may be a predetermined relational expression.

Processing unit 20 outputs brightness information indicating the brightness determined by the determining unit to displaying unit 30.

2. Operation

Figure 5:
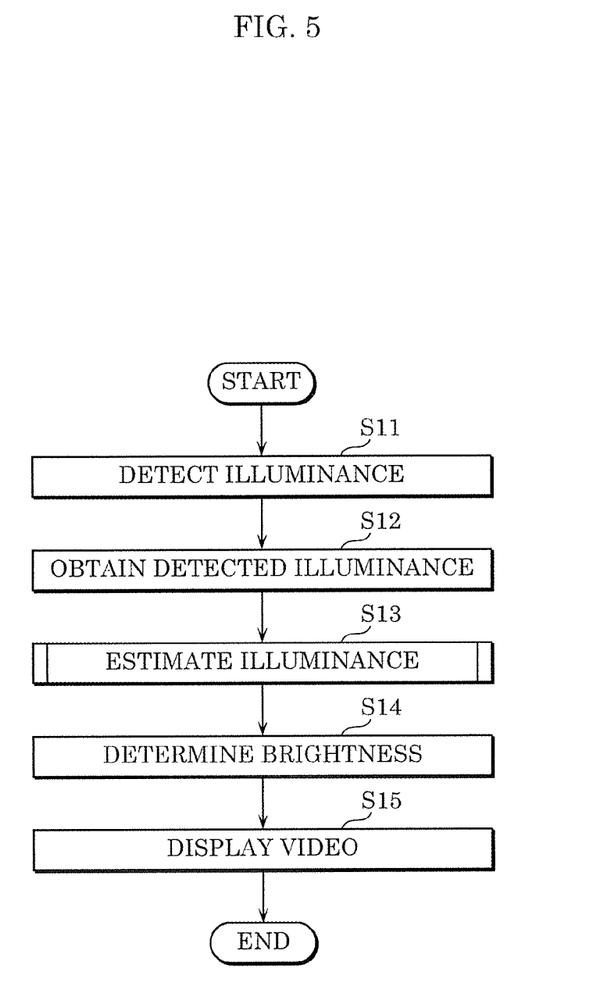
FIG. 5 is a flowchart illustrating an example of the operation of the display apparatus according to the embodiment.

FIG. 5 is a flowchart illustrating an example of the operation of the display apparatus according to this embodiment.

As illustrated in FIG. 5, in display apparatus 1, detecting unit 10 detects the illuminance at dashboard 301 of vehicle 300 (S11).

Obtaining unit 121 of processing unit 20 obtains the detected illuminance (S12).

Estimating unit 122 of processing unit 20 calculates an estimated illuminance using the obtained detected illuminance (S13).

Figure 6:
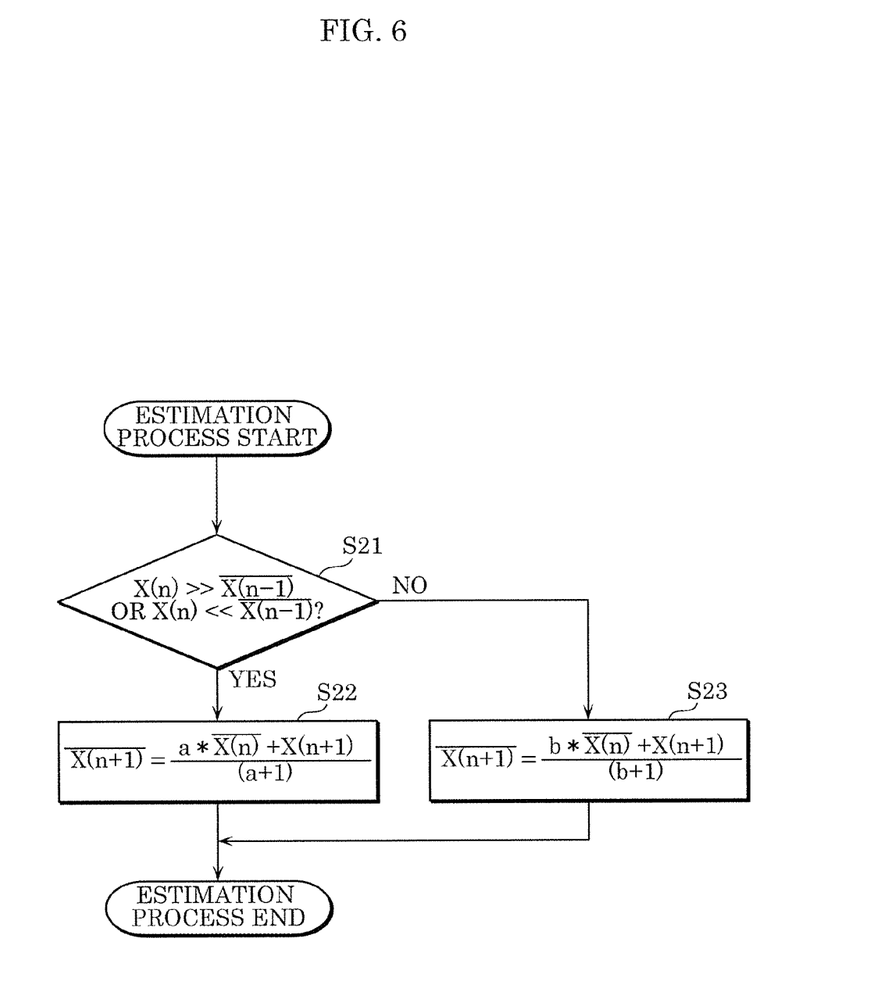
FIG. 6 is a flowchart illustrating an example of an estimating process, out of the operation of the display apparatus according to the embodiment.

In the estimating process in step S13, specifically, the process illustrated in FIG. 6 is performed.

FIG. 6 is a flowchart illustrating an example of the estimating process, out of the operation of the display apparatus according to this embodiment.

Estimating unit 122 determines, using the obtained detected illuminance X (n), whether or not Equation 2 or Equation 3 is satisfied (S21).

When estimating unit 122 determines that Equation 2 or Equation 3 is satisfied (Yes in S21), estimating unit 122 calculates the second estimated illuminance using Equation 1, with N as value a (for example, a=2) which is less than or equal to the first threshold value (S22).

On the other hand, when estimating unit 122 determines that Equation 2 or Equation 3 is not satisfied (No in S21), estimating unit 122 calculates the second estimated illuminance using Equation 1, with N as value b (for example, b=19) which is greater than or equal to the second threshold value (S23).

When the second estimated illuminance is calculated according to step S22 or step S23, the estimating process ends.

Returning to FIG. 5, determining unit 123 of processing unit 20 determines the brightness of the video using the estimated illuminance and the relationship information (S14).

Displaying unit 30 displays the video at the determined brightness of the video (S15).

It should be noted that the process from step S11 to step S15 is performed repeatedly while display apparatus 1 operates.

3. Process Example

Next, a process example for the case where vehicle 300 travels on a road in which illuminance is different depending on the position will be described using FIG. 7 and FIG. 8.

Figure 7:
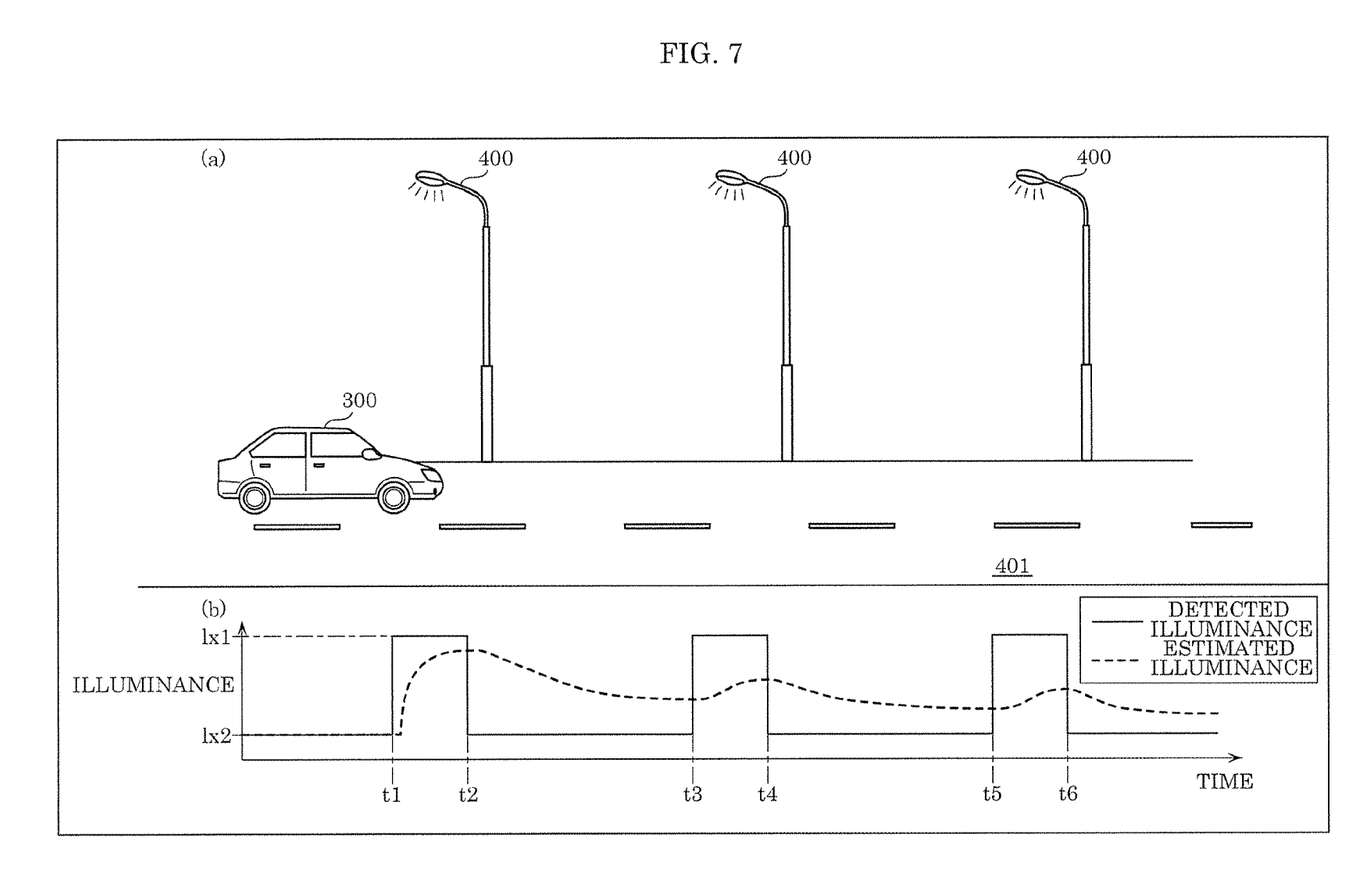
FIG. 7 is a diagram for describing a process example for the case of traveling along a road in which a plurality of street lights are disposed at a predetermined interval, at a dark time period such as night.

FIG. 7 is a diagram for describing a process example for the case of traveling along a road in which a plurality of street lights are disposed at a predetermined interval, at a dark time period such as night. FIG. 8 is a diagram for describing a process example for the case of entering a tunnel at a bright time period such as daytime.

As illustrated in (a) in FIG. 7, consider the case where vehicle 300 travels at a dark time period along road 401 in which a plurality of street lights 400 are disposed at a predetermined interval (for example, 40 m), for example at 50 km/h. In this case, as indicated by a solid line in (b) in FIG. 7, a change in illuminance occurs in a cycle (approximately 3 sec.) that is in accordance with the speed of vehicle 300 and the interval of the streetlights. For example, one streetlight 400 illuminates road 401 at a first illuminance lx1 over a range of 10 in, and at a second illuminance lx2 outside that range. It should be noted that it assumed that detecting unit 10 detects the same illuminance as the illuminance to road 401. Detecting unit 10 repeats detecting first illuminance lx1 at timing t1, detecting second illuminance lx2 at timing t2 approximately 0.75 sec thereafter, and detecting first illuminance lx1 at timing t3 approximately 2.25 sec thereafter.

In this manner, it repeatedly becomes bright and dark at a cycle that is in accordance with the speed of vehicle 300 and the interval of the streetlights. In this case, when illuminance is adjusted simply according to the detected illuminance, the change in the brightness of the video to be displayed by displaying unit 30 becomes frequent, and thus flickering occurs.

Furthermore, in particular, in a configuration in which the optical axis of detecting unit 10 is oriented toward a space above the main viewing angle of the driver, the change in illuminance of light from above tends to be detected. In contrast, since the driver drives facing forward, the change in illuminance of light from above is not easily felt compared to when the driver is facing upward. In other words, when the brightness of displaying unit 30 is adjusted based on the change in illuminance according to light from above, there is a big difference with the change in illuminance felt by the driver. As such, the occurrence of flickering in displaying unit 30 is easily felt by the driver.

In contrast, in display apparatus 1 according to this embodiment, the illuminance at a position near the head of the driver sitting in the driver's seat of vehicle 300 is estimated by estimating unit 122, and the brightness of displaying unit 30 is adjusted according to the estimated illuminance which is the estimation result. As such, like the change in estimated illuminance indicated by the broken line in (b) in FIG. 7, the change in estimated illuminance can be made gradual with respect to the change in detected illuminance indicated by the solid line. Accordingly, in display apparatus 1 which adjusts the brightness of displaying unit 30 in conformity with the change in outside illuminance, even in the case where vehicle 300 travels at night along road 401 in which a plurality of streetlights 400 are disposed at a predetermined interval, the occurrence of flickering in the video displayed by displaying unit 30 can be reduced.

Figure 8:
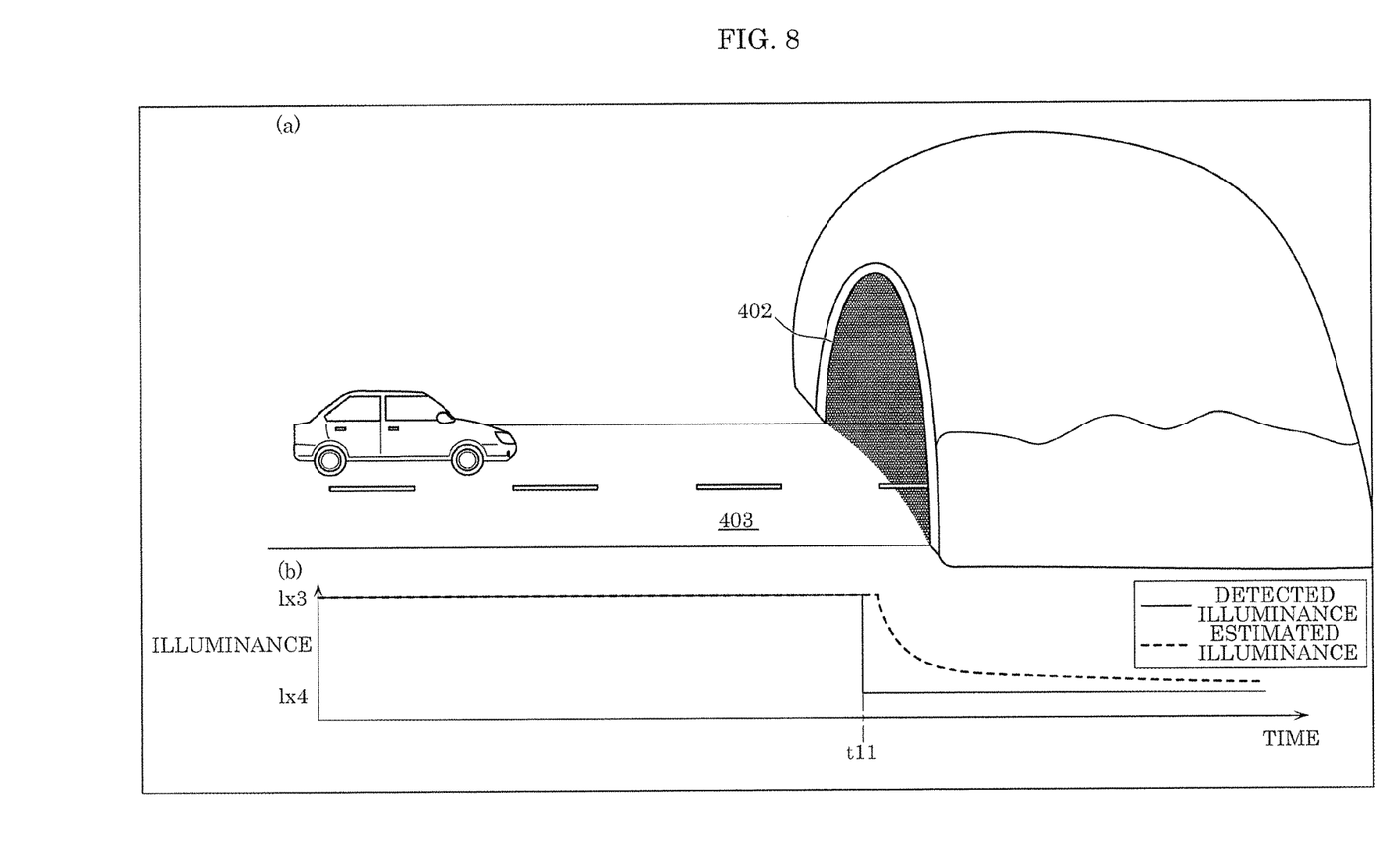
FIG. 8 is a diagram for describing a process example for the case of entering a tunnel at a bright time period such as daytime.

Furthermore, as illustrated in (a) in FIG. 8, consider the case where vehicle 300 travels at a bright time period along road 403 that enters tunnel 402. In this case, as indicated by the solid line in (b) in FIG. 8, the detected illuminance drops sharply at timing t11 at which vehicle 300 enters tunnel 402. For example, in a time period such as daytime on a sunny day, detecting unit 10 detects the light of the sun in an area of road 403 other than tunnel 402, and thus detects an extremely high third illuminance lx3. Then, since the light of the sun is blocked by tunnel 402 when vehicle 300 enters tunnel 402, detecting unit 10 detects fourth illuminance lx4 lower than third illuminance lx3 at timing t11. Specifically, the illuminance difference between third illuminance lx3 and fourth illuminance lx4 is greater than the illuminance difference between first illuminance lx1 and second illuminance lx2.

In this manner, when detecting unit 10 detects a big change in illuminance due to vehicle 300 entering tunnel 402, estimating unit 122 repeats the calculating of the estimated illuminance using Equation 1 in which N is set to 2. As such, in display apparatus 1, it is possible to make the change in detected illuminance gradual while calculating an estimated illuminance indicated by the broken line in (b) in FIG. 8, which follows the change in detected illuminance indicated by solid line. Accordingly, in display apparatus 1 which adjusts the brightness of displaying unit 30 in conformity with the change in outside illuminance, even when traveling in the daytime along road 403 which enters tunnel 402, the brightness of displaying unit 30 can be reduced immediately.

It should be noted that although the case of entering tunnel 402 in daytime is described in FIG. 8, the same is true for the case of exiting from tunnel 402, with only bright and dark being reversed.

4. Advantageous Effects, Etc

Display apparatus 1 according to this embodiment includes obtaining unit 121, estimating unit 122, determining unit 123, and displaying unit 30. Obtaining unit 121 obtains, from detecting unit 10, the detected illuminance at dashboard 301 of vehicle 300 which is the detected illuminance detected by detecting unit 10. Estimating unit 122 estimates an estimated illuminance which is the illuminance at a position near the head of the driver sitting in the driver's seat of vehicle 300, using the detected illuminance. Determining unit 123 determines the brightness of the video by using the estimated illuminance and relationship information indicating a predetermined relationship between illuminance and brightness. Displaying unit 30 displays video at the brightness determined by determining unit 123.

Accordingly, since the illuminance change at the position of the head of the driver is estimated and the brightness of a video to be displayed by displaying unit 30 is determined according to the estimated illuminance obtained by estimating, the brightness of the video can be adjusted to a brightness that is in accordance with the illuminance change felt by the driver.

In this embodiment, display apparatus 1 further includes detecting unit 10. Detecting unit 10 detects the illuminance at dashboard 301 at a plurality of different timings. Obtaining unit 121 obtains the plurality of detected illuminances detected by detecting unit 10 at the plurality of timings. Estimating unit 122 calculates an illuminance between a first detected illuminance detected at a first timing and a first estimated illuminance estimated at a timing that is ahead of the first timing, as a second estimated illuminance at the first timing.

As such, it is possible to make the illuminance change in the plurality of detected illuminances gradual, and estimate an estimated illuminance. Accordingly, the brightness of the video can be effectively adjusted to a brightness that is in accordance with the illuminance change felt by the driver.

In this embodiment, estimating unit 122 calculates the second estimated illuminance using Equation 1.

As such, it is possible to effectively estimate the illuminance change at the position of the head of the driver.

In this embodiment, when the ratio between the first detected illuminance and the average value is greater than or equal to k or less than or equal to 1/k, estimating unit 122 calculates the second estimated illuminance using Equation 1, with N as value a which is less than or equal to the first threshold value. Furthermore, when the ratio is less than k and greater than 1/k, estimating unit 122 calculates the second estimated illuminance using Equation 1, with N as value b which is greater than or equal to a second threshold value greater than the first threshold.

As such, when the illuminance change is big, the estimated illuminance can be estimated so that the illuminance change in the estimated illuminance becomes bigger, and when the illuminance change is small, the estimated illuminance can be estimated so that the illuminance change in the estimated illuminance becomes smaller. Accordingly, the brightness of the video can be effectively adjusted to a brightness that is in accordance with the illuminance change felt by the driver.

In this embodiment, estimating unit 122 performs a predetermined mathematical operation on an initial detected illuminance detected at an initial timing to thereby calculate an initial estimated illuminance at the initial timing.

As such, the estimated illuminance can be easily estimated.

5. Variations 5-1. Variation 1

Estimating unit 122 calculates the second estimated illuminance using Equation 1 in the foregoing embodiment but is not limited to such. For example, when the first detected illuminance detected at a first timing is greater than the first estimated illuminance estimated at a timing ahead of the first timing, the estimating unit may calculate the second estimated illuminance by adding, to the first estimated illuminance, a value smaller than the absolute value of the difference between the first detected illuminance and the first estimated illuminance. When the first detected illuminance is less than the first estimated illuminance, the estimating unit may calculate the second estimated illuminance by subtracting, from the first estimated illuminance, a value smaller than the absolute value of the difference between the first detected illuminance and the first estimated illuminance. It should be noted a value smaller than the absolute value of the difference between the first detected illuminance and the first estimated illuminance is, for example, a value obtained by multiplying the absolute value by a certain coefficient smaller than 1 (for example, 0.8).

In this manner, the estimated illuminance may be estimated so that the estimated illuminance becomes bigger when the detected illuminance becomes bigger and becomes smaller when the detected illuminance becomes smaller, and so that the variation width of the estimated illuminance is smaller than the variation width of the detected illuminance. Accordingly, the illuminance at the position near the head of the driver can be estimated effectively.

5-2. Variation 2

Display apparatus 1 includes detecting unit 10, processing unit 20, and displaying unit 30 in the foregoing embodiment, but is not limited to such. For example, a display apparatus that does not include detecting unit 10 may be employed. Specifically, detecting unit 10 may be a sensor module which is provided outside of the display apparatus, and is connected to the display apparatus to allow communication.

5-3. Variation 3

Display apparatus 1 is a head-up display that projects virtual image I1 onto windshield 201 of vehicle 300 in Embodiment 1 but is not limited to a head-up display, and may be a transmission-type liquid-crystal display, an organic EL (electro-luminescent) display, an inorganic EL (electro-luminescent) display, etc.

It should be noted that the respective structural components are configured using dedicated hardware in the each of the foregoing exemplary embodiments but may be realized by executing a software program suitable for the respective components. Each of the structural components may be implemented by a program executing component, such as a CPU or processor, reading and executing a software program recorded on a recording medium such as a hard disc or a semiconductor memory. Here, the software for implementing display apparatus 1 in each of the foregoing exemplary embodiments is a program such as that described below.

Specifically, this program causes a computer to execute a display method including: obtaining, from an illuminance sensor, a detected illuminance which is an illuminance at a dashboard of a vehicle detected by the illuminance sensor; estimating, using the detected illuminance, an estimated illuminance which is illuminance at a position near the head of a driver sitting in a driver's seat of the vehicle; determining brightness of a video, using the estimated illuminance and relationship information indicating a predetermined relationship between illuminance and brightness; and displaying the video at the brightness determined.

Although a display apparatus and a display method according to one or more aspects of the present invention has been described based on the foregoing exemplary embodiments, the present invention is not limited to the foregoing embodiments. Forms obtained by various modifications to the exemplary embodiment that can be conceived by a person of skill in the art as well as forms realized by combining structural components of different exemplary embodiments, which are within the scope of the essence of the present invention may be included in the scope of the one or more aspects of the present invention.

INDUSTRIAL APPLICABILITY

The present disclosure is useful as a display apparatus, etc., capable to effectively adjusting the brightness of video even when there is a constraint on the placement of the illuminance sensor.

What is claimed is:

1. A display apparatus, comprising:
a memory that stores instructions; and
a processor that, when executing the instructions stored in the memory, performs operations including:
obtaining, from an illuminance sensor, a detected illuminance which is an illuminance at a dashboard of a vehicle detected by the illuminance sensor;
estimating, using the illuminance detected at the dashboard, an estimated illuminance which is an illuminance at a position near a head of a driver sitting in a driver's seat of the vehicle;
determining a brightness of a video, using the estimated illuminance and relationship information stored in the memory indicating a predetermined relationship between the estimated illuminance and the brightness of the video; and
displaying the video at the determined brightness, wherein
in the obtaining of the detected illuminance,
a plurality of detected illuminances are obtained, the plurality of detected illuminances being detected by the illuminance sensor at a plurality of different timings, and
in the estimating of the estimated illuminance,
an illuminance between a first detected illuminance detected at a first timing of the plurality of different timings and a first estimated illuminance estimated at a timing ahead of the first timing is calculated, the calculated illuminance being a second estimated illuminance at the first timing,
the second estimated illuminance is calculated by adding, to the first estimated illuminance, a value less than an absolute value of a difference between the first detected illuminance and the first estimated illuminance, when the first detected illuminance is greater than the first estimated illuminance, and
the second estimated illuminance is calculated by subtracting, from the first estimated illuminance, a value less than the absolute value, when the first detected illuminance is less than the first estimated illuminance.

2. The display apparatus according to claim 1, wherein in the estimating of the estimated illuminance, the second estimated illuminance is calculated, using Equation 1 below:

$$(X(n+1))^- = (N*(X(n))^- + X(n+1))/((N+1)) \quad \text{(Equation 1)}$$

where:
$(X(n+1))^-$ is the second estimated illuminance;
$(X(n))^-$ is an average value of detected illuminances at first to nth timings;
$X(n+1)$ is a detected illuminance at an $(n+1)$th timing;
n is a natural number greater than or equal to 2; and
N is a natural number greater than or equal to 2.

3. The display apparatus according to claim 2, wherein in the estimating of the estimated illuminance:
the second estimated illuminance is calculated, using Equation 1, with N as a value less than or equal to a first threshold value, when a ratio between the first detected illuminance and the average value is greater than or equal to k or less than or equal to 1/k; and
the second estimated illuminance is calculated, using Equation 1, with N as a value greater than or equal to a second threshold value greater than the first threshold value, when the ratio is less than k and greater than 1/k.

4. The display apparatus according to claim 1, wherein in the estimating of the estimated illuminance, calculating an initial estimated illuminance at an initial timing by performing a predetermined mathematical operation on an initial detected illuminance that is detected at the initial timing.

5. A display method, comprising:
obtaining via a processor a detected illuminance from an illuminance sensor, the detected illuminance being an illuminance at a dashboard of a vehicle detected by the illuminance sensor;
estimating via the processor an estimated illuminance using the illuminance detected at the dashboard, the estimated illuminance being illuminance at a position near a head of a driver sitting in a driver's seat of the vehicle;
determining via the processor a brightness of a video using the estimated illuminance and relationship information stored in a memory indicating a predetermined relationship between the estimated illuminance and the brightness of the video; and displaying the video at the determined brightness, wherein in the obtaining of the detected illuminance,
- a plurality of detected illuminances are obtained, the plurality of detected illuminances being detected by the illuminance sensor at a plurality of different timings, and in the estimating of the estimated illuminance,
- an illuminance between a first detected illuminance detected at a first timing of the plurality of different timings and a first estimated illuminance estimated at a timing ahead of the first timing is calculated, the calculated illuminance being a second estimated illuminance at the first timing,
- the second estimated illuminance is calculated by adding, to the first estimated illuminance, a value less than an absolute value of a difference between the first detected illuminance and the first estimated illuminance, when the first detected illuminance is greater than the first estimated illuminance, and
- the second estimated illuminance is calculated by subtracting, from the first estimated illuminance, a value less than the absolute value, when the first detected illuminance is less than the first estimated illuminance.

\* \* \* \* \*